US010686939B1

(12) United States Patent
Narayanaswamy

(10) Patent No.: US 10,686,939 B1
(45) Date of Patent: *Jun. 16, 2020

(54) CONFERENCING AND MEETING IMPLEMENTATIONS WITH ADVANCED FEATURES

(71) Applicant: 8x8, Inc., San Jose, CA (US)

(72) Inventor: Ramprakash Narayanaswamy, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,327

(22) Filed: Mar. 12, 2019

Related U.S. Application Data

(63) Continuation of application No. 15/218,827, filed on Jul. 25, 2016, now Pat. No. 10,230,847, which is a
(Continued)

(51) Int. Cl.
*H04M 3/533* (2006.01)
*H04M 3/56* (2006.01)
(Continued)

(52) U.S. Cl.
CPC ... *H04M 3/53333* (2013.01); *H04M 3/42195* (2013.01); *H04M 3/42382* (2013.01);
(Continued)

(58) Field of Classification Search
CPC ................................................ H04M 3/53333
See application file for complete search history.

(56) References Cited

U.S. PATENT DOCUMENTS 3,873,771 A  3/1975 Kleinerman et al.
3,937,878 A  2/1976 Judice
(Continued)

FOREIGN PATENT DOCUMENTS

DE  3640680  6/1988
GB  2173675  10/1986
(Continued)

OTHER PUBLICATIONS

"BT MeetMe Global Access®". British Telecommunications plc, Product/Service Sheet, 2 pgs. (2007) www.bt.com/globalservices/conferencing.
(Continued)

*Primary Examiner* — Joseph T Phan
(74) *Attorney, Agent, or Firm* — Crawford Maunu PLLC

(57) ABSTRACT

Meeting and conferencing systems and methods are implemented in a variety of manners. Consistent with one embodiment of the present disclosure, a method for operating an audio conference system that includes at least one logic circuit and a caller interface involves receiving incoming telephony calls at the caller interface. A logic circuit is used to authenticate incoming telephony calls. Menu options are provided to authenticated, incoming telephony calls. In response to a selection of the menu options, an incoming telephony call is prompted to select a callback number. The logic circuit monitors for a trigger event. A participant is called back using the selected call back number in response to detecting the trigger event. The called-back participant is then placed into a conference.

8 Claims, 3 Drawing Sheets

Related U.S. Application Data continuation of application No. 14/666,576, filed on Mar. 24, 2015, now Pat. No. 9,401,994, which is a continuation of application No. 14/454,491, filed on Aug. 7, 2014, now Pat. No. 9,008,107, which is a continuation of application No. 13/179,277, filed on Jul. 8, 2011, now Pat. No. 8,817,801.

(51) Int. Cl.
  *H04M 3/493* (2006.01)
  *H04M 3/42* (2006.01)
  *H04M 7/00* (2006.01)

(52) U.S. Cl.
  CPC ............ *H04M 3/493* (2013.01); *H04M 3/56* (2013.01); *H04M 3/561* (2013.01); *H04M 3/563* (2013.01); *H04M 7/0042* (2013.01); *H04M 7/0051* (2013.01); *H04M 7/0054* (2013.01); *H04M 2203/2072* (2013.01); *H04M 2203/5063* (2013.01)

(56) References Cited

U.S. PATENT DOCUMENTS

| | | |
|---|---|---|
| 4,099,202 A | 7/1978 | Cavanaugh |
| 4,237,484 A | 12/1980 | Brown et al. |
| 4,485,400 A | 11/1984 | Lemelson et al. |
| 4,521,806 A | 6/1985 | Abraham |
| 4,544,950 A | 10/1985 | Tu |
| 4,593,318 A | 6/1986 | Eng et al. |
| 4,715,059 A | 12/1987 | Cooper-Hart et al. |
| 4,725,897 A | 2/1988 | Konishi |
| 4,766,499 A | 8/1988 | Inuzuka |
| 4,774,574 A | 9/1988 | Daly et al. |
| 4,780,757 A | 10/1988 | Bryer et al. |
| 4,780,758 A | 10/1988 | Lin et al. |
| 4,789,895 A | 12/1988 | Mustafa et al. |
| 4,829,372 A | 5/1989 | McCalley et al. |
| 4,831,438 A | 5/1989 | Bellman, Jr. et al. |
| 4,837,798 A | 6/1989 | Cohen et al. |
| 4,849,811 A | 7/1989 | Kleinerman |
| 4,888,638 A | 12/1989 | Bohn |
| 4,905,315 A | 2/1990 | Solari et al. |
| 4,924,303 A | 5/1990 | Brandon et al. |
| 4,943,994 A | 7/1990 | Ohtsuka et al. |
| 4,955,048 A | 9/1990 | Iwamura et al. |
| 4,962,521 A | 10/1990 | Komatsu et al. |
| 4,963,995 A | 10/1990 | Lang |
| 4,967,272 A | 10/1990 | Kao et al. |
| 4,985,911 A | 1/1991 | Emmons et al. |
| 4,991,009 A | 2/1991 | Suzuki et al. |
| 5,016,107 A | 5/1991 | Sasson et al. |
| 5,073,926 A | 12/1991 | Suzuki et al. |
| 5,130,792 A | 7/1992 | Tindell et al. |
| 5,136,628 A | 8/1992 | Araki et al. |
| 5,150,211 A | 9/1992 | Charbonnel et al. |
| 5,164,980 A | 11/1992 | Bush et al. |
| 5,170,427 A | 12/1992 | Guichard et al. |
| 5,231,483 A | 7/1993 | Sieber et al. |
| 5,268,734 A | 12/1993 | Parker et al. |
| 5,276,866 A | 1/1994 | Paolini |
| 5,280,530 A | 1/1994 | Trew et al. |
| 5,339,076 A | 8/1994 | Jiang |
| 5,341,167 A | 8/1994 | Guichard et al. |
| 5,347,305 A | 9/1994 | Bush et al. |
| 5,379,351 A | 1/1995 | Fandrianto et al. |
| 5,384,594 A | 1/1995 | Sieber et al. |
| 5,400,068 A | 3/1995 | Ishida et al. |
| 5,410,326 A | 4/1995 | Goldstein |
| 5,430,809 A | 7/1995 | Tomitaka |
| 5,432,597 A | 7/1995 | Parker et al. |
| 5,471,296 A | 11/1995 | Parker et al. |
| 5,483,589 A | 1/1996 | Ishida et al. |
| 5,495,284 A | 2/1996 | Katz |
| 5,539,452 A | 7/1996 | Bush et al. |
| 5,559,551 A | 9/1996 | Sakamoto et al. |
| 5,561,518 A | 10/1996 | Parker et al. |
| 5,568,185 A | 10/1996 | Yoshikazu |
| 5,570,177 A | 10/1996 | Parker et al. |
| 5,572,317 A | 11/1996 | Parker et al. |
| 5,572,582 A | 11/1996 | Riddle |
| 5,574,964 A | 11/1996 | Hamlin |
| 5,587,735 A | 12/1996 | Ishida et al. |
| 5,594,813 A | 1/1997 | Fandrianto et al. |
| 5,619,265 A | 4/1997 | Suzuki et al. |
| 5,640,195 A | 6/1997 | Chida |
| 5,657,246 A | 8/1997 | Hogan et al. |
| 5,675,375 A | 10/1997 | Riffee |
| 5,677,727 A | 10/1997 | Gotoh et al. |
| 5,722,041 A | 2/1998 | Freadman |
| 5,835,126 A | 11/1998 | Lewis |
| 5,901,248 A | 5/1999 | Fandrianto et al. |
| 5,905,942 A | 5/1999 | Stoel et al. |
| 5,978,014 A | 11/1999 | Martin et al. |
| 6,026,097 A | 2/2000 | Voois et al. |
| 6,104,334 A | 8/2000 | Allport |
| 6,124,882 A | 9/2000 | Voois et al. |
| 6,275,575 B1 | 8/2001 | Wu |
| 6,310,538 B1 | 10/2001 | Boucher |
| 6,441,842 B1 | 8/2002 | Fandrianto et al. |
| 6,526,581 B1 | 2/2003 | Edson |
| 6,611,537 B1 | 8/2003 | Edens et al. |
| 6,731,625 B1 | 5/2004 | Eastep et al. |
| 6,771,760 B1 | 8/2004 | Vortman et al. |
| 6,771,766 B1 | 8/2004 | Shafiee et al. |
| 7,065,709 B2 | 6/2006 | Ellis et al. |
| 7,394,803 B1 | 7/2008 | Petit-Huguenin et al. |
| 7,912,075 B1 | 3/2011 | Holland et al. |
| 7,996,463 B2 | 8/2011 | Mousseau et al. |
| 8,358,762 B1 | 1/2013 | Renner |
| 8,817,801 B1 * | 8/2014 | Narayanaswamy .... H04M 3/56 370/401 |
| 9,008,107 B1 | 4/2015 | Narayanaswamy |
| 2002/0054601 A1 | 5/2002 | Barraclough et al. |
| 2002/0135580 A1 | 9/2002 | Kelly et al. |
| 2003/0016656 A1 | 1/2003 | Schwartz |
| 2004/0078436 A1 | 4/2004 | Demsky et al. |
| 2004/0174976 A1 | 9/2004 | Elliott |
| 2006/0154653 A1 | 7/2006 | Wilson |
| 2006/0242254 A1 | 10/2006 | Okazaki et al. |
| 2007/0115930 A1 | 5/2007 | Reynolds et al. |
| 2007/0162553 A1 | 7/2007 | Dewing et al. |
| 2007/0180386 A1 | 8/2007 | Ballard et al. |
| 2007/0252891 A1 | 11/2007 | Gurley |
| 2008/0091778 A1 | 4/2008 | Ivashin et al. |
| 2008/0159503 A1 | 7/2008 | Helbling et al. |
| 2008/0165207 A1 | 7/2008 | Koshak et al. |
| 2010/0058234 A1 | 3/2010 | Salame et al. |
| 2010/0125353 A1 | 5/2010 | Petit-Huguenin |
| 2011/0149809 A1 | 6/2011 | Narayanaswamy |
| 2011/0149811 A1 | 6/2011 | Narayanaswamy |
| 2011/0154204 A1 | 6/2011 | Narayanaswamy |
| 2011/0264996 A1 | 10/2011 | Norris, III |
| 2011/0271192 A1 | 11/2011 | Jones et al. |
| 2012/0269335 A1 | 10/2012 | Goguen et al. |
| 2013/0143539 A1 | 6/2013 | Baccay et al. |
| 2013/0202095 A1 | 8/2013 | Jones et al. |
| 2014/0232817 A1 | 8/2014 | Jones et al. |
| 2015/0215368 A1 | 7/2015 | Maeda et al. |

FOREIGN PATENT DOCUMENTS

| | | |
|---|---|---|
| JP | 61159883 | 7/1986 |
| JP | 01175452 | 7/1989 |
| JP | 03229588 | 10/1991 |
| JP | 09149333 | 6/1997 |
| WO | 9110324 | 7/1991 |

OTHER PUBLICATIONS

"WebEx Audio: Optimize your meeting experience." Cisco /WebEx Communications, Inc., Product/Service Sheet, 3 pgs. (download

(56) References Cited

OTHER PUBLICATIONS

Mar. 16, 2011). Webex.com.au/ . . . /integrated-audio.html.
"Avaya Conference Bridges." Avaya, Product Sheet, 2 pgs. (download Mar. 16, 2011) (copyright 2008). Convergedillinois.com/Avaya_Conference.
"Wholesale Conference Calls.com." Wholesale Conference Calls, Product/Service Sheet, 4 pgs. (download Mar. 16, 2011). Wholesaleconferencecall.com/large.even.
"Scheduling a Meeting with the Advanced Scheduler." Vodafone WebConferencing, 2 pgs. (Jun. 2009). www.vodafone.gr.

\* cited by examiner

US 10,686,939 B1

CONFERENCING AND MEETING IMPLEMENTATIONS WITH ADVANCED FEATURES

FIELD OF THE INVENTION

The present invention relates generally to conferencing and meeting mechanisms and to systems, methods and devices for facilitating meetings using audio and/or video conferencing between multiple parties.

BACKGROUND AND OVERVIEW

The ability to conduct productive and efficient meetings can be an important aspect of the success of the related endeavor, whether the endeavor is business, learning or otherwise. Audio conference bridges provide a useful tool for remote meetings between multiple individuals. The flexibility allows for people to easily connect from many different locations and using different technologies. Individuals can connect using, for example, land line telephones, cellular telephones, Voice-over-Internet-Protocol (VoIP) telephones and computer interfaces. This flexibility can be useful for allowing participants to connect from any number of different locations, with minimal inconvenience.

Scheduling concerns between multiple individuals can be difficult and can sometimes lead to wasted time and missed opportunities to connect. Participants may enter an audio conference at different times, some can be early entrants and others late entrants. Participants can also leave (and reenter) the audio conference while it is still in progress, or even before it begins. Other times a participant may be unsure whether or not their presence is necessary or may only be needed for certain aspects of the audio conference. Participants can also make mistakes as to the time of an audio conference and forget to call in or call in unnecessarily.

SUMMARY

Aspects of the present disclosure are directed to conferencing solutions that address challenges, including those discussed above, and that are applicable to a variety of conferencing applications, devices, systems and methods. These and other aspects of the present disclosure are exemplified in a number of implementations and applications, some of which are shown in the figures and characterized in the claims section that follows.

Consistent with embodiments of the present disclosure, a method for operating an audio conference system, that includes at least one logic circuit and a caller interface, involves receiving incoming telephony calls at the caller interface. A logic circuit is used to authenticate incoming telephony calls. Menu options are provided to authenticated, incoming telephony calls. In response to a selection of the menu options, an incoming telephony call is prompted to select a callback number. The logic circuit monitors for a trigger event. A participant is called back using the selected call back number and in response to detecting the trigger event. The called-back participant is placed into a conference.

Consistent with other embodiments of the present disclosure, an audio conference system comprises a caller interface configured to receive incoming telephony calls, and a logic circuit. The logic circuit can be configured to authenticate incoming telephony calls and to provide menu options to authenticated incoming telephony calls. The logic circuit can then prompt, in response to a selection of the menu options, an incoming telephony call to select a callback number. The logic circuit can also monitor for a trigger event, and callback a participant using the selected call back number and in response to detecting the trigger event. The logic circuit can place the called-back participant into a conference.

The above summary is not intended to describe each illustrated embodiment or every implementation of the present disclosure.

BRIEF DESCRIPTION OF THE DRAWINGS

The disclosure may be more completely understood in consideration of the following detailed description of various embodiments of the disclosure in connection with the accompanying drawings, in which.

Figure 1:
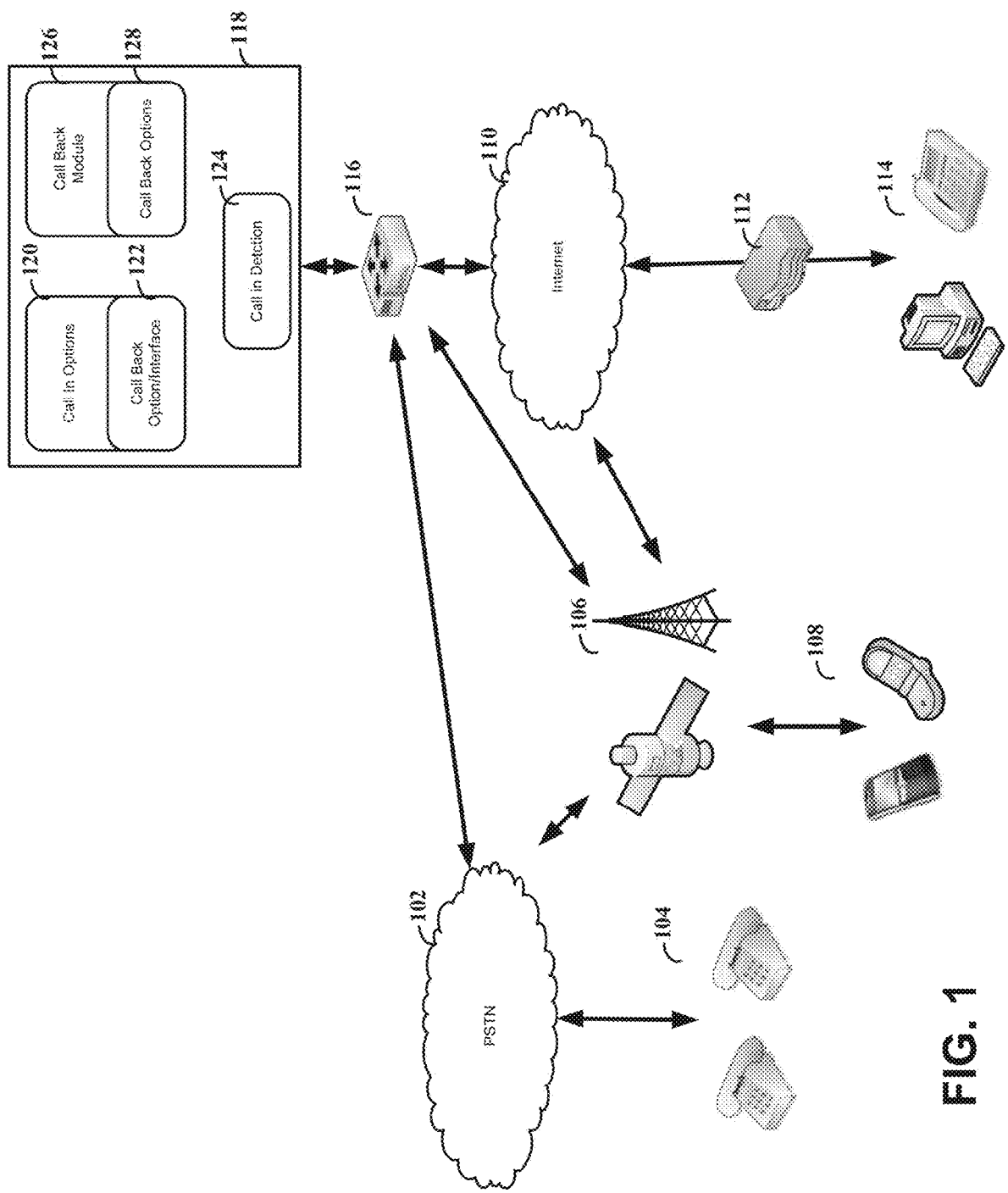
FIG. 1 depicts a system diagram that includes a number of communication devices and an audio conferencing system, consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are directed to conferencing bridges and related approaches, their uses and systems for the same. While the present disclosure is not necessarily limited to such applications, various aspects of the disclosure may be appreciated through a discussion of examples using this context.

The present disclosure includes a discussion of different audio conferencing systems that provide audio conference bridge functionality to participants. Unless otherwise specified, the various audio conferencing systems discussed herein can include additional functions (e.g., video services or content/document sharing).

Consistent with particular embodiments of the present disclosure, an audio conferencing system is configured to provide participants with callback functionality and/or messaging capabilities. For instance, a participant can enter an audio conference by calling into the audio conferencing system using a telephone. The audio conferencing system provides the participant with various menu options. One of the menu options includes a callback option in which the audio conferencing system can contact the participant contingent upon one or more trigger events. The participant can then disconnect from the audio conferencing system and receive a callback upon the occurrence of a trigger event.

As one example embodiment, the participant can request a callback that is contingent upon the entrance of another participant to the audio conference. Moreover, the first participant can leave a message for the other participant to indicate that they were previously on the audio conference. Upon receipt of the callback, the first participant can rejoin the audio conference.

Consistent with aspects of the present disclosure, an audio conferencing system is configured to provide an interface for a first participant to send a message for other participants to receive without the first participant joining the audio conference. For instance, the first participant can send a text message (e.g., using either short-messaging-service (SMS) or Multimedia Messaging Service (MMS)) or email to the audio conferencing system. The term SMS is used herein in a non-limiting manner and would implicitly include MMS where appropriate. The audio conferencing system is configured to provide the message to the other participants. In one implementation, the audio conferencing system can perform a text-to-speech conversion and then provide an audio version of the message to conference participants. This can allow all of the participants to be made aware of the message at the same time.

In other implementations, the audio conferencing system can forward the SMS text or email to participants. In such implementations, the audio conferencing system accesses profile data for the participants to determine how to forward the message (e.g., an SMS to a telephone number or email to an email address). This can allow the message to be delivered to various participants without necessarily interrupting the audio conference. In various other implementations, the message can be forwarded only to a subset of the participants. For instance, some audio conferences are configured as a lecture format where one or more individuals takes the lead and do all or most of the speaking. In such implementations, there might be hundreds or even thousands of participants. If one of the leading individuals is going to be late, the individual may wish for the other lead individuals to be notified; however, it might not be desirable to notify the many other participants. Thus, an incoming message from a lead individual can be forward only to other lead individuals.

Consistent with one embodiment of the present disclosure, the audio conferencing system can be configured to provide multiple numbers, email addresses or other contact addresses that are used to identify which participants are to receive the message. Thus, for the same audio conference, a text message could be sent to a first telephone number that indicates that all participants are to receive the message (whether as an audio message that interrupts the conference or as text messages sent to each individual) and a second telephone number that indicates only a subset of participants are to receive the message. The sender of the text message can select the appropriate number based upon the desired recipients.

The audio conferencing system can also be configured to send a message to a participant that has left the conference. The message can be provided upon the occurrence of a trigger event. Thus, the participant can be notified, for example, once another participant has joined the audio conference. This notification message can be provided via various different protocols including, but not limited to, text messaging and email. According to certain embodiments, the text message or email can include a link that automatically connects the participant to the audio conference in response to selection of the link by the participant.

Consistent with certain embodiments of the present disclosure, the audio conferencing system is configured to allow remote access to the status of the audio conference without calling the audio conferencing system. For instance, a first participant can send a text message to the audio conferencing system. The audio conferencing system can be configured to respond with an indication of whether or not the audio conference has been joined by any other participants. If no other participants have joined, the audio conferencing system can respond with such an indication. Thereafter, the first participant can be notified once another participant joins. Moreover, the audio conferencing system can count the first participant as having joined to avoid situations in which multiple participants are waiting for someone to join the audio conference.

For instance, the audio conferencing system can receive a text from a first participant that is requesting a status update. The audio conferencing system responds by indicating that no other participants have joined the conference. When a second participant sends a similar request, however, the audio conferencing system can indicate that another participant is (likely) available. The first participant can then be notified of the existence of another potential participant and both participants can be encouraged to join the audio conference. This can be particularly useful for allowing a potential participant to easily indicate availability without needing to first join the audio conference, which can be time consuming and/or expensive due to call-in costs.

Embodiments of the present disclosure recognize that the various functions of the audio conferencing system can be useful for many different situations. For instance, an audio conference can begin with a number of participants. The audio conference can proceed even though another participant is absent. The other participant, however, might be required to discuss certain items. The other participant might be caught up in another meeting that is running late or otherwise unable to call in on-time. It might still be possible for the other participant to send a message (e.g., email or text) to the audio conferencing system to let the current participants of the audio conference know when the other participant might be able to join (if at all). Thereafter, one or more of the current participants might disconnect from the meeting, but then wish to continue with the meeting once the other participant is available. The audio conferencing system allows the current participants to request a callback or other notification once the other participant joins the audio conference. In this manner, the current participants need not stay on the audio conference until the other participant joins, but rather can rejoin in response to the other participant joining the audio conference.

In another example, one or more current participants might not be needed until later in the audio conference. The audio conferencing system allows these (currently unnecessary) participants to leave the audio conference, while still providing a mechanism for the audio conferencing system to callback or otherwise request that they rejoin. When the remaining participants of the audio conference determine that the (previously unnecessary) participants become needed, they can select a rejoin option and the audio conferencing system will callback or request that the absent participants rejoin the audio conference.

The above examples are not meant to be limiting, and show but a few of the possible uses and configurations that are consistent with aspects of the present disclosure.

Turning now to the figures, FIG. 1 depicts a system diagram that includes a number of communication devices and an audio conferencing system, consistent with embodiments of the present disclosure. The system diagram represents a high level diagram and, due to the complexity of the various system components, omits a number of technical and functional details of the system that would be implicitly understood as being present. Various different communications devices can connect to an audio conferencing system 116 using different communication paths and protocols. FIG.

1 depicts a few, non-limiting, examples of such different communications devices and their associated protocols/paths.

Telephone devices 104 communicate through public-switched-telephone network (PSTN) 102. Telephone devices 104 can include relatively simple communications devices that are configured to interface a circuit switched network (PSTN 102). Telephone devices 104 can transmit and receive analog signals that represent audio. Telephone devices 104 can use dual-tone multi-frequency (DTMF) signals for control signaling (e.g., telephone number dialing, interactive call menu selection and/or data entry). Telephone devices 104 can also include more complicated communications devices, such as communications devices configured for use with an Integrated Services Digital Network (ISDN).

Cellular/satellite/wireless devices 108 are configured to communicate using wireless signaling (e.g., transmitting and receiving data using radio frequency (RF) signals). Non-limiting examples of wireless devices 108 include cellular or satellite telephones, smart telephones and/or laptop/home/tablet computers configured with cellular capabilities. These devices can communicate by establishing wireless communication channels between themselves and a wireless base station 106, such as a cellular telephone tower or satellite telephone provider. The wireless base station 106 can connect to the audio conferencing system 116 through multiple paths including, but not necessarily limited to, PSTN 102 and/or the Internet 110.

Voice-over Internet Protocol (VoIP) devices 114 communicate using packet-based communications, which can be transmitted over the Internet 110. If necessary, a PBX/gateway device 112 can provide additional functionality and/or control. IP PBX servers or similar control devices can assist in communications to and/or from VoIP devices 114.

Audio conferencing system 116 can include one or more caller interfaces to allow connections from communications devices of audio conference participants. As discussed herein, audio conferencing system 116 is not necessarily limited to audio functions and can also provide other functions, such as video, document sharing, desktop sharing, email and text messaging. The caller interfaces of audio conference system 116 can include one or more of a PSTN interface, an IP interface and a cellular interface. Audio conferencing system 116 can include one or more messaging interfaces that can receive messages for playback/retrieval by (future or current) participants of an audio conference. These messaging interfaces can include one or more of a PSTN interface, an IP interface and a cellular interface (e.g., for receiving text messages).

Audio conferencing system 116 can provide various call-related functions, some of which are shown by functional block 118. These functions can include call in detection 124, which allows the audio conferencing system 116 to determine that an incoming call has been received. This can also include different levels of security and authentication procedures. Call in options 120 provide a participant with various options including, but not limited to, a callback option/interface 122. If a participant selects the callback option 122, then a callback module 126 can be invoked. Callback module 126 can provide additional options 128 to a participant and subsequently call the participant back in response to the detection of a trigger event (e.g., after a new participant enters the meeting).

For instance, a caller may dial a telephone number linked to the audio conferencing system 116. This telephone number could be a generic number for the audio conferencing system 116 or a specific number for a specific audio conference (e.g., where the audio conferencing system 116 is associated with several telephone numbers). Upon connection, the caller could be asked to enter a number identifying the audio conference and/or providing authentication information. Call in options 120 can also provide (e.g., using an interactive voice response unit) the caller with various options. These options can include muting their voice, announcing their name upon entrance to the audio conference, inviting additional participants, listing participants in the audio conference, leaving the audio conference, leaving a message for other entrants to the audio conference and/or requesting a callback upon a trigger event. If the caller selects the callback module, then the audio conferencing system 116 can request a number at which the caller can be reached. Alternatively, the audio conferencing system 116 can use information stored about the caller to use for a callback number. The number can be provided using automatic number identification (ANI) or from profile information of the caller. A caller can be identified (for the purposes of selecting an appropriate profile) using identifying information that can include, but is not necessarily limited to, ANI or caller entered identification numbers.

According to some embodiments of the present disclosure, the audio conferencing system 116 can be configured to store profile information for individual participants. For instance, the audio conferencing system 116 can be used by a large company with many different employees. A contact list of employees can include information such as name, telephone number(s), email, division/position within the company and preferences for audio conferencing.

Consistent with certain embodiments of the present disclosure, the audio conferencing system 116 can provide a graphical user interface (GUI) that can be accessed over the Internet or a similar data network. This GUI can facilitate various different selection options for participants. For instance, the GUI can allow a participant to see which other participants were previously connected and/or requested a callback. The GUI can then be used to initiate a callback to one or more of the other participants. The GUI can also display messages left by other participants (e.g., using an SMS text or email). Another possible option for the GUI is to allow a calling participant to select how/when to be called back. For instance, a calling participant could select a particular trigger event that will cause the audio conferencing system 116 to callback the calling participant. This trigger event could be, but is not limited to, the entrance of any other participant, the entrance of a specific participant (or group of participants) or a prompt from other participants (e.g., indicating that the meeting has progressed to a point that presence of the calling participant is desired).

The GUI need not be limited to such functionality and can provide various other features. For instance, the GUI can be configured in accordance with the teaching of U.S. patent application Ser. No. 12/646,552, filed Dec. 23, 2009 and entitled "Web-Enabled Conferencing And Meeting Implementations With Flexible User Calling And Content Sharing Features," which is fully-incorporated herein by reference. Various other features of U.S. patent application Ser. No. 12/646,552 can also be used in combination with aspects of the present disclosure.

Figure 2:
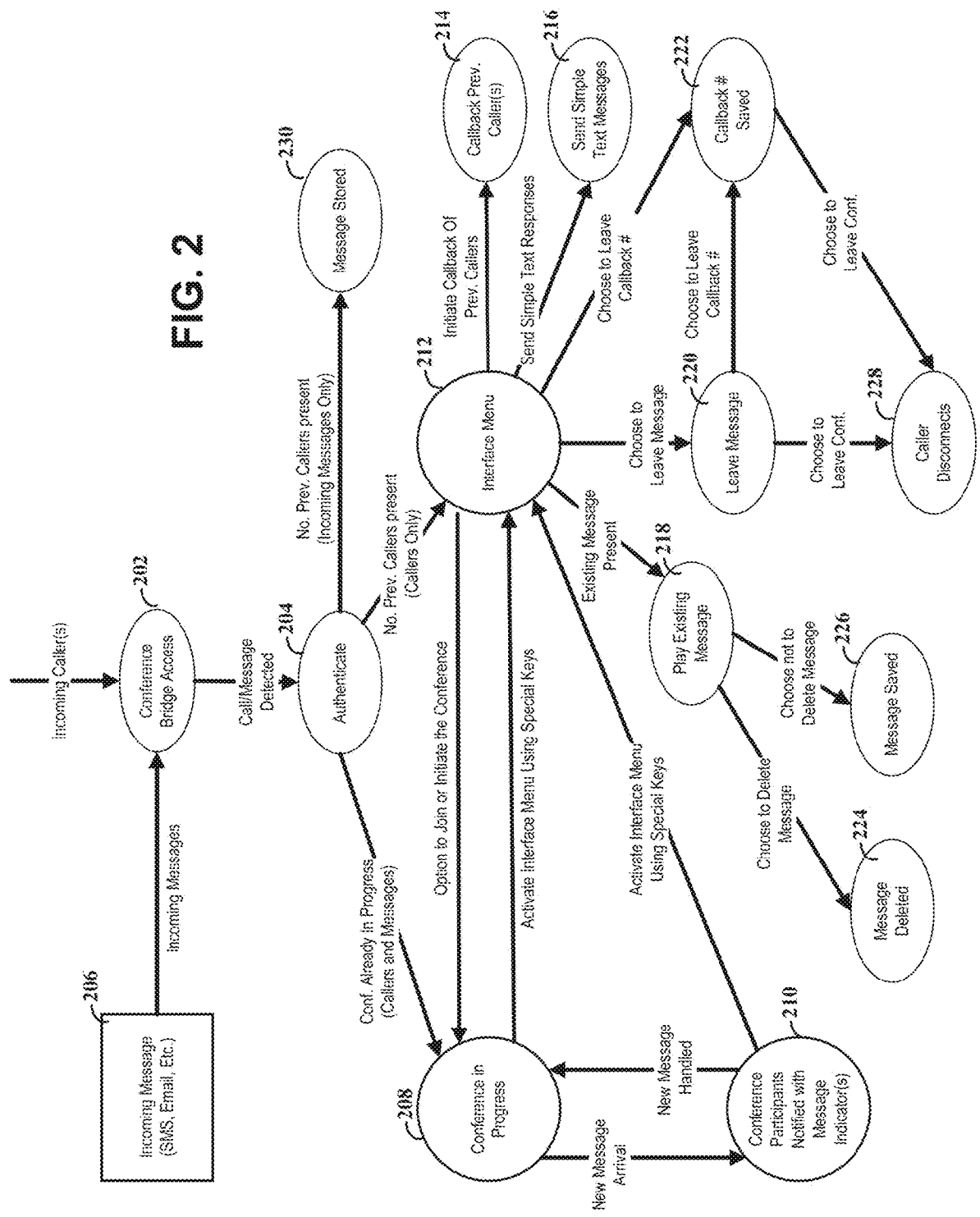
FIG. 2 depicts a flow diagram for the management of an audio conference, consistent with embodiments of the present disclosure.

FIG. 2 depicts a flow diagram for management of an audio conference, consistent with embodiments of the present disclosure. Conference Bridge Access 202 is provided for incoming connections to the system. This access can include, but is not necessarily limited to, incoming telephony calls (e.g., over PSTN or VoIP connections). Conference Bridge Access 202 can also be configured to handle other types of incoming messages 206. These messages can include, but are not necessarily limited to, SMS, MIMS, email or instant messaging services.

In response to detecting an incoming connection/message, the system can authenticate 204 the message. The authentication can include a number of different mechanisms. For a received telephony call, the caller can be asked for identification information, such as a conference number and a passcode. Callers can also be authenticated based upon the number from which they call. Callers might also connect using a web-enabled interface to initiate the connection and the web-enabled interface can verify the user (e.g., by requiring a user name and password). Incoming messages 206 can be verified using similar mechanisms. For instance, an incoming SMS/MMS text can include a passcode and/or conference bridge number in the text content. In particular embodiments, a software application residing on the mobile device can prompt a user for this information and then format the data according to a protocol accepted by the conference bridge. In other embodiments, the conference bridge can search the content of the text message for the passcode and/or conference bridge. In certain instances, the authentication 204 can be effectively disabled if the conference bridge is open to any callers that have the proper call-in number.

If an incoming caller is detected and authenticated 204, the interface menu 212 will provide the caller with menu options in the event that the conference is not already in progress 208. If, however, the conference is already in progress 208, then the caller can immediately join the conference in progress 208. Although not depicted, the system can also be configured to provide a caller with menu options through interface menu 212 even when the conference is in progress 208.

Interface menu 212 can be configured to provide a caller with a number of different interface options. The option paths depicted in FIG. 2 show a few of the many different possible options and are not meant to be limiting. One such option path allows a connecting caller the option of leaving a message 220. This message will be left for future callers seeking to join into the same conference, which has yet to start. The message can be in various forms including, but not limited to, an audio recording of the participant, a standard message (which can be selected or simply a default message), a written/text-based message and/or a callback number. The connecting caller can also choose to leave a callback number 222. This allows the connecting caller to receive a callback upon a later trigger event, such as a subsequent caller entering and/or initiating the conference 208. At any point, a caller can choose to leave the conference system and disconnect 228.

Consistent with embodiments of the present disclosure, once a caller is properly authenticated, the audio conferencing system can determine whether or not a previous participant has requested a callback with a trigger event that corresponds to the authenticated caller joining the conference bridge. For instance, the trigger event could be the valid entrance of any caller or the entrance of a specific caller.

If the audio conferencing system determines that a callback trigger event has occurred (e.g., entrance/authentication of a participant), then the audio conferencing system can (optionally) provide an indication that the callback 214 is to occur. For instance, the audio conferencing system can play a recording that explains that a previous participant is being brought back into the audio conference. In addition to (or in place of) this indication, the audio conferencing system can play a recording or other message provided by the previous participant. The audio conferencing system can also provide the entering participant with an option for the entering participant to select the disconnected caller so that they can be called back 214. Alternatively, the audio conferencing system can automatically (without participant prompting) callback 214 (or otherwise contact) the disconnected caller.

In some instances, multiple participants might decide to leave an existing audio conference. For instance, the meeting might not be able to proceed until a moderator or some other specific person joins. The audio conferencing system can be configured to allow existing participants with an option to record a message when leaving the conference.

Another menu option allows participant to select playback/retrieval 218 for an existing message. The existing message could have been left by a previous caller, or could have been a received message 206. After the message has been provided by the system, the system can allow the message to be deleted 224 or remain stored/saved 226 for future playback/retrieval. For instance, a message might indicate to all incoming callers that the meeting time has been changed. Thus, each incoming caller would be provided the message, with the system saving the message for other callers so that they are made aware of the change. The system therefore could also be configured to allow the message to be stored for a given time (e.g., until the new meeting time).

If an incoming message 206 is received and authenticated 204, it will be stored 230 for subsequent playback when there are not any current callers in the conference. If, however, there are current callers in the conference, the arrival of a new message can be accompanied by a notification 210. This notification can be, for instance, an audio interrupt stating that a message has arrived. The notification can also indicate how to listen/retrieve the message. The conference can then continue 208. If the conference participants choose to listen to the message (e.g., by activating the menu interface using special keys), then the system can play/retrieve the message 218.

The audio conferencing system can also be configured to allow for callers to respond to received or stored messages 216. For instance, an individual might send an SMS text message to a particular conference using the systems messaging interface. The system can be configured to allow connected caller(s) (whether an active participant or a newly entered participant) to respond to the individual sending the SMS text message by sending a reply text message. This message could be selected from pre-stored responses (e.g., "the meeting is in progress," "you have been requested to join meeting XYZ," or "your presence is not necessary at meeting XYZ.") The system can also be configured to allow a participant to manually input a desired message (e.g., using their telephone key pad). Further options include the ability to send an automated link to join the conference in the message. By selecting the link, the receiving individual can be directed to the conference without the need to dial the required number manually.

The specific flow of FIG. 2 is not meant to be limiting and should be understood to be modifiable in a manner that is consistent with express and implied embodiments discussed herein.

Figure 3:
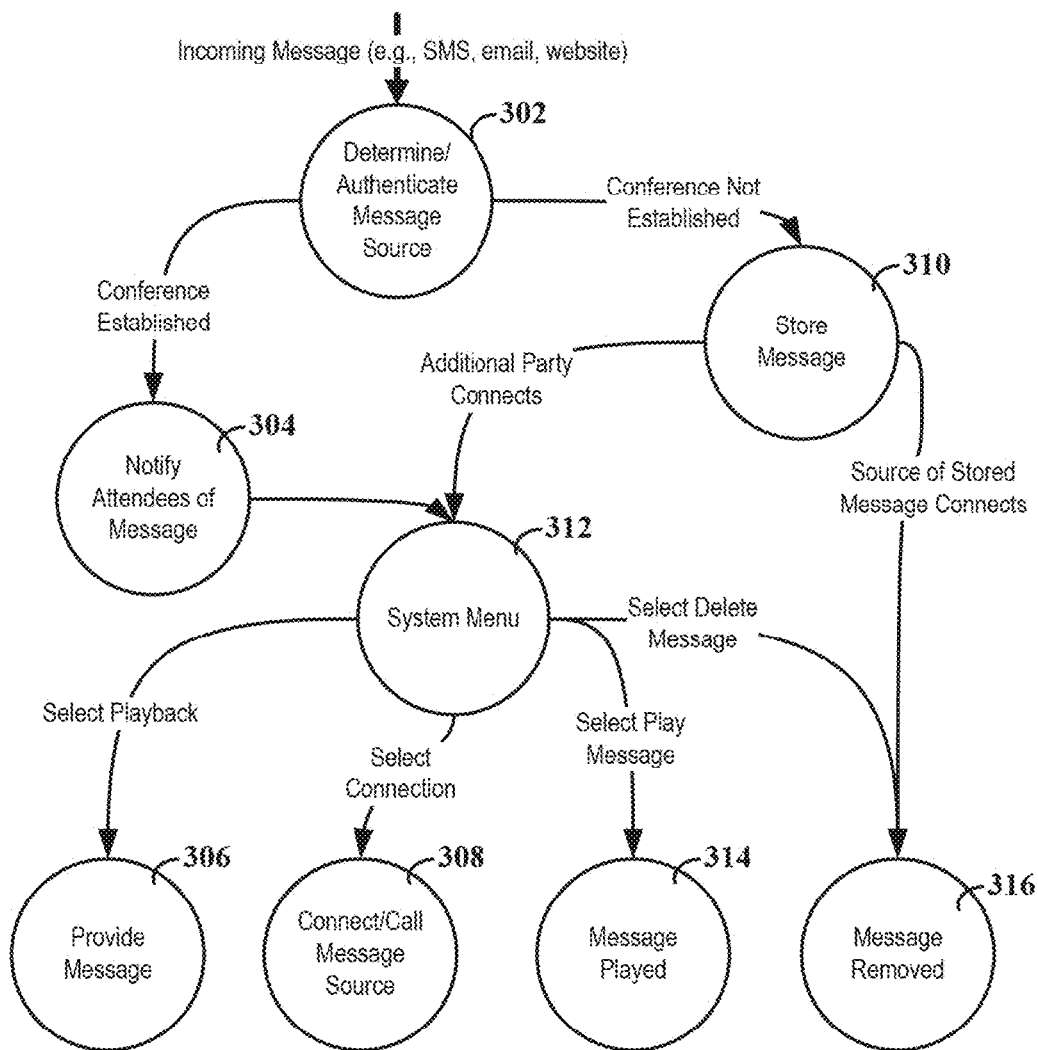
FIG. 3 depicts a flow diagram for managing messages for an audio conference, consistent with embodiments of the present disclosure.

FIG. 3 depicts a flow diagram for handling messages for an audio conference, consistent with embodiments of the present disclosure. Consistent with various embodiments, a participant that is not connected to the audio conference can leave a message for other participants. In one embodiment, the message can be left after a user joins the audio conference, but decides to leave (e.g., requesting a callback if other participants join the audio conference). In other embodiments, the message can be provided without first joining the audio conference. For instance, an individual might be unable to make the predetermined meeting time and yet wishes to notify other participant(s) of this problem.

The audio conferencing system can receive the incoming message (e.g., SMS text, audio recording/file, email and/or input from a GUI/website). The audio conferencing system can then (optionally) determine the source of the message and/or authenticate the message at position 302. The audio conferencing system can also determine whether the message is intended for an audio conference that is already established, or for an audio conference that has not yet been established. If the audio conferencing system determines that the message is intended for an established audio conference, the audio conferencing system can notify current participants of an incoming message at position 304.

The audio conferencing system can be configured to automatically provide the message or to allow the current participants to select when the message is provided. In the latter case, the audio conferencing system responds to input from participants by playing the message at position 306. The audio conferencing system 312 can be configured to delete the message at position 316. The audio conferencing system can automatically delete the message or delete the message in response to a participant selecting a deletion option.

In certain embodiments of the present disclosure, the audio conferencing system is configured to allow the participants to indicate that the message providing participant should be connected with a call (or callback as the case may be), which corresponds to position 308. For instance, the message may indicate that a participant is currently available and would like to join when the current meeting participants being to discuss a certain topic.

If the audio conferencing system determines that no audio conference has been established, the message can be stored at position 310. Thereafter, the audio conferencing system can wait for a new connection by a participant.

According to some embodiments of the present disclosure, the audio conferencing system is configured to provide/play the message to one or more entering participants at position 314. Other embodiments, however, contemplate that the audio conferencing system is configured to determine whether a connecting participant is different from the original, message-leaving participant. If the audio conferencing system determines that the connecting participant is different, then the audio conferencing system can provide/play the message to one or more entering participants at position 314. If, however, the audio conferencing system determines that the entering participant is the same as the original, message-leaving participant, then the message need not be played and can even be deleted at position 316.

Aspects of the present disclosure can be implemented using a variety of processing/logic circuits, communications arrangements and combinations thereof. Particular implementations can use one or more specially configured computer processors that execute instructions to perform one or more of the aspects discussed herein. Various portions can be implemented using discrete or combinatorial logic, analog circuitry and various forms of tangible/non-transitory (computer-readable) storage mediums.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. For example, the methods, devices and systems discussed herein may be implemented in connection with a variety of technologies such as those involving home computers, servers, laptops, cellular phones, personal digital assistants, iPhones®, Blackberries® and the like. The disclosure may also be implemented using a variety of approaches, such as those involving VoIP, cellular and landline telephone connections. Such modifications and changes do not depart from the true spirit and scope of the present disclosure, including that set forth in the following claims.

What is claimed is:

1. An audio conference system for use with a caller interface configured to receive incoming telephony calls, comprising:
 a logic circuit, including a central processing unit, configured to execute an algorithm by:
  authenticating the incoming telephony calls for access to a particular audio conference;
  providing menu options, via the caller interface to the authenticated incoming telephony calls;
  prompting, in response to a selection of the menu options, an incoming telephony call to select a callback number;
  monitoring for a trigger event selected by at least one of the authenticated incoming telephony calls;
  calling back, in response to detecting the trigger event, a participant using the selected callback number; and
  placing the called-back participant into the particular audio conference; and
 a server, including a communications circuit configured to communicate over the Internet or another wideband data network, and configured to place multiple participants in the particular audio conference, allow the multiple participants to request a callback, to allow a specified participant to call back the multiple participants in response to a specified participant calling into the audio conference system, and to respond to a receipt of a text-based message at the caller interface by providing an indication of the text-based message to participants of an in-progress audio conference.

2. The system of claim 1, further including a messaging interface configured to receive text-based messages.

3. The system of claim 2, further including the caller interface being configured to receive text-based messages and wherein the logic circuit is further configured to respond to a receipt of a text-based message at the messaging interface by storing the text-based message and providing an indication of the text-based message to a subsequent incoming telephony call.

4. The system of claim 1, further including a messaging interface configured to receive text-based messages and configured to receive email and text messages, and wherein the trigger event is an entrance of a specific participant or a group of participants into the particular audio conference, wherein the logic circuit is further configured to authenticate the text-based messages by searching the content of the messages for an authenticating code.

5. The system of claim 1, wherein the trigger event is a successful authentication of a subsequent telephony call.

6. The system of claim 1, wherein the trigger event is an entrance of any other participant into the particular audio conference.

7. The system of claim 1, wherein the caller interface includes a Voice-over Internet Protocol (VoIP) interface, and further including a messaging interface configured to receive text-based messages and to identify participants in the particular audio conference that are to receive the text-based message.

8. The system of claim 1, wherein the caller interface includes a data communications center interface, and further including a messaging interface configured to receive text-based messages and to identify participants in the particular audio conference that are to receive the text-based message.

\* \* \* \* \*